US007827502B2

(12) United States Patent
Scheu et al.

(10) Patent No.: US 7,827,502 B2
(45) Date of Patent: Nov. 2, 2010

(54) GRAPHICAL ACCESS TO DATA OBJECTS

(75) Inventors: Sylvia Scheu, Sandhausen (DE); Uwe Riss, Heidelberg (DE); Anja Modler-Spreitzer, Viemheim (DE)

(73) Assignee: SAP AG, Walldorf (DE)

( * ) Notice: Subject to any disclaimer, the term of this patent is extended or adjusted under 35 U.S.C. 154(b) by 338 days.

(21) Appl. No.: 12/026,493

(22) Filed: Feb. 5, 2008

(65) Prior Publication Data

US 2008/0126992 A1   May 29, 2008

Related U.S. Application Data

(63) Continuation of application No. 10/611,835, filed on Jun. 30, 2003, now Pat. No. 7,353,457.

(51) Int. Cl.
*G06F 3/048* (2006.01)
*G06F 3/00* (2006.01)

(52) U.S. Cl. ............... 715/765; 715/762; 715/763; 715/835; 715/836

(58) Field of Classification Search ......... 715/761–765, 715/771–772, 834, 735, 841, 700, 862–865, 715/835–837, 976, 977
See application file for complete search history.

(56) References Cited

U.S. PATENT DOCUMENTS 7,194,465 B1 * 3/2007 MacGregor .................... 707/6

* cited by examiner

*Primary Examiner*—Tadeese Hailu
(74) *Attorney, Agent, or Firm*—Mintz, Levin, Cohn, Ferris, Glovsky & Popeo, P.C.

(57) ABSTRACT

A method, apparatus and system for accessing data objects from a storage medium includes rendering a combination of graphical structures. Each graphical structure depicts a storage hierarchy or logic, and can include a link or reference to stored data objects. The combination of graphical structures defines a number of graphical objects. Each graphical object is associated with a coordinate display and linking mechanism to access one or more data objects represented by the graphical object. Thus, a number of collections of data objects is represented graphically for quick access.

19 Claims, 5 Drawing Sheets

GRAPHICAL ACCESS TO DATA OBJECTS

CROSS REFERENCE TO RELATED APPLICATION

This application is a continuation of U.S. patent application Ser. No. 10/611,835, entitled "Graphical Access To Data Objects" filed on Jun. 30, 2003, now U.S. Pat. No. 7,353,457, the contents of which are hereby incorporated by reference.

BACKGROUND

The following description relates to a graphical user interface (GUI) for accessing data objects. A data object can be a file, a document, an image, a graphic, or portion thereof, or any other collection or format of information that can be electronically stored in a storage medium. Stored data objects can be accessed and retrieved from storage by a user through an interface. A computing system commonly employs a GUI for data object access. In the GUI, representations of data objects are presented to a user in at least one type of arrangement. An arrangement defines a relationship among a group of data objects. A data object can be represented as a graphic or text, and the arrangement can usually be viewed on a display for quick access.

For example, data objects relating to a particular project can be associated with at least one of a number of different phases of a project life cycle. Each project phase can then be displayed as a folder in a GUI, and a data object such as a document that relates to a particular phase can be represented as a document icon within that phase's folder. A user wishing to access a particular data object operates an input device to direct a pointer to the icon representing the data object.

Graphical representations of arrangements of data objects can be standardized in a computing system. For instance, application programs that are compatible with the Microsoft Windows™ operating system display data objects as a collection of large icons or small icons, or as a list, and may include details or a thumbnail representation. Folders, documents, pictures, files, etc., can each have their own unique identifying icon. Further, icons can be arranged and displayed according to name, type, size, or date, etc. Alternatively, Web-based applications that are accessible from a web page or portal can display a variety representations of data objects as a hyperlink defined according to a markup language. Common representations include underlined blue text, an icon or other graphic.

Regardless how an arrangement of data objects is displayed, a user is usually presented with only one arrangement at a time. If two or more arrangements are presented, the user can usually only navigate one arrangement at a time. As one data object may be associated with more than one arrangement, and as several storage arrangements can overlap, conventional access and retrieval systems are limited in their capability to display multiple arrangements of data objects for quick access.

SUMMARY

This document discloses a method and system that improves access to stored data objects. In one aspect, a method of providing access to data objects includes representing each of two or more arrangements of data objects as a graphical structure that, when combined in a graphical user interface, define a plurality of user-selectable graphical objects. Each graphical object provides access to one or more data objects associated with a corresponding portion of the combination of the first and second arrangements. The data objects can be accessed from any storage medium.

According to another aspect, a method includes representing a first arrangement of data objects as a first graphical structure in a graphical user interface (GUI), and concurrently representing a second arrangement of data objects as a second graphical structure in the GUI. The combination of the first and second graphical structures in the GUI defines a plurality of user-selectable graphical objects, and each graphical object provides access to one or more data objects associated with a corresponding portion of the combination of the first and second arrangements.

An apparatus for accessing data objects includes a GUI comprising a plurality of user-selectable graphical objects. Each graphical object is defined by a combination of a first graphical structure representing a first arrangement of data objects and a second graphical structure representing a second arrangement of data objects. As described above, each graphical object provides access to one or more data objects associated with a corresponding portion of the combination of the first and second arrangements.

In yet another aspect, a system for accessing data objects includes a display that provides the GUI. The system further includes a storage medium for storing one or more data objects, and a processor responsive to instructions stored in an instruction memory. The processor is configured to represent a first arrangement of data objects as a first graphical structure in the GUI, and to represent a second arrangement of data objects as a second graphical structure in the GUI. A combination of the first and second graphical structures in the GUI defines a plurality of user-selectable graphical objects, each graphical object providing access to one or more data objects associated with a corresponding portion of the combination of the first and second arrangements.

Details of one or more implementations are set forth in the accompanying drawings and the description below. Other features and advantages may be apparent from their description and drawings, and from the claims.

BRIEF DESCRIPTION OF THE DRAWINGS

These and other aspects will now be described in detail with reference to the following drawings.

DETAILED DESCRIPTION

The systems and techniques described here relate to providing access to data objects stored according to one or more storage arrangements.

Figure 1:
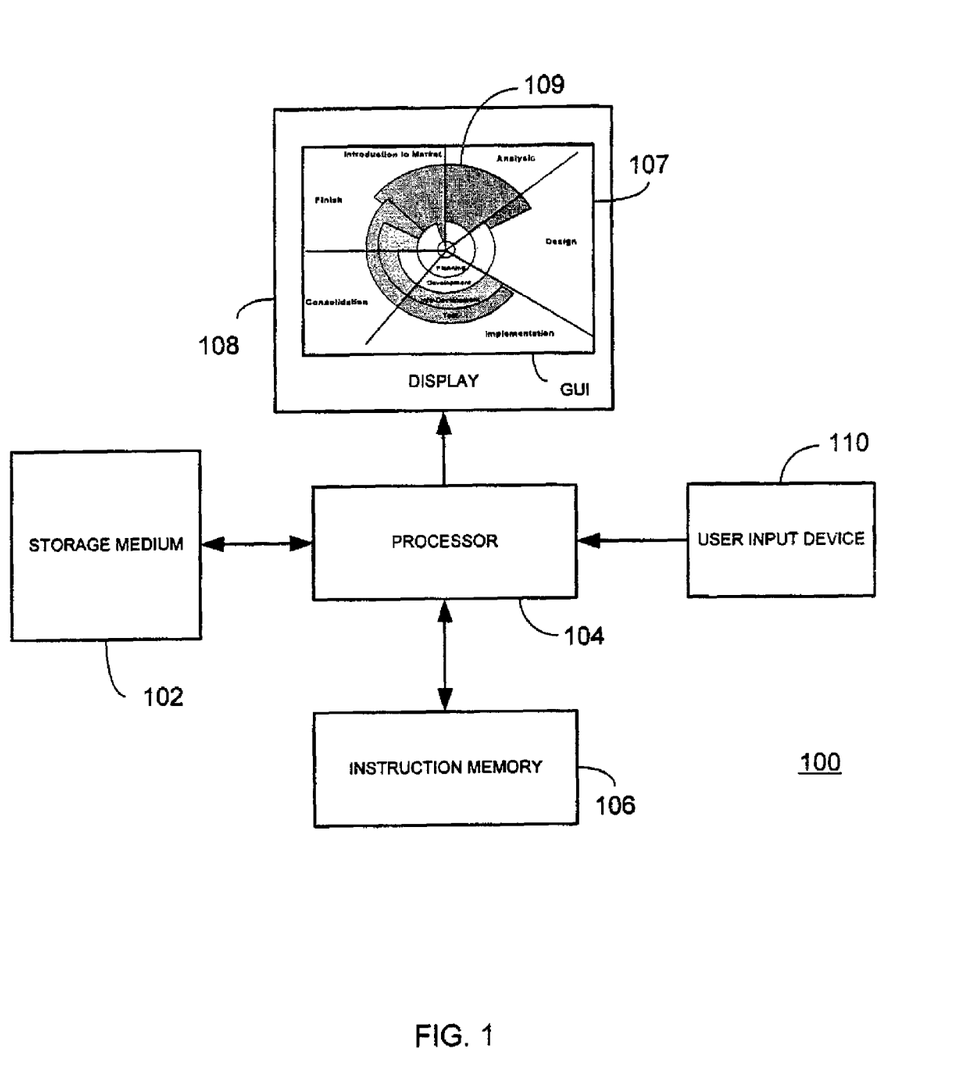
FIG. 1 is a block diagram of a computing system for providing access to stored data objects.

FIG. 1 is a block diagram of a system 100 for providing access to stored data objects. In the pictured example, the system 100 includes a storage medium 102 for storing one or more data objects in electromagnetic form for access by a computer processor 104. The storage medium 102 can include a range of device types, such as disk drives, removable media drives, redundant array of independent disks, optical storage, holographic storage, etc. The storage medium 102 can also include a range of storage technologies, such as a relational database, an object-oriented database, or distributed database. The storage medium 102 is depicted in the example as a single component, but represents a storage system that may be distributed across multiple computing platforms. The storage medium 102 is also depicted as an integrated component of the computing system 100, but may also be remotely located from and accessible by the processor 104 by any of a number of forms of communication.

The processor 104 is configured to operate under instruction from an instruction memory 106. The instruction memory 106 can be any type of primary storage medium or technology, such as random access memory (RAM), read-only memory (ROM), or disk drive memory, etc. The instruction memory 106 includes machine-readable instruction, such as computer software or instruction code that causes the processor 104 to operate in accordance with the machine-readable instruction. The computer software can include operating system code, application code, or other machine-readable instruction code.

The processor 104 may include a graphics processor for generating two- or three-dimensional graphical surfaces or objects out of input data from the instruction memory 106 and or storage medium 102. The processor 104 receives user commands/requests via user input device 110. The user input device 110 may be a mouse or other input device which sends a signal representing a user command/request to the processor 104, such as a microphone, a keyboard, a keypad, trackball, light pen, laser pointer, or the like.

The processor 104 generates a graphical user interface (GUI) 107 in a display 108. The GUI 107 can be provided as a portal to a network, a window in a browser program, or provided as an interface for any other application. The display 108 can be a cathode ray tube (CRT), liquid crystal display (LCD), light-emitting diode, gas plasma, or other image projection technology. The display 108 is also known as a monitor or video display terminal (VDT) on which the GUI 107 is displayed. The display 108 can include a device that produces the GUI 107, or may be integrated with the processor 104. For instance, signal-handling devices such as a video adapter, video RAM, and digital-to-analog converters for generating the GUI 107 may be part of the processor 104, the display 108, or distributed among both.

The storage medium 102 is configured to store one or more data objects. The data objects are stored according to a logical or physical arrangement. Each arrangement may represent a hierarchy or organizational structure, such as by date (i.e. creation, modification, storage, etc.), by relationship (i.e. product catalog, product life cycle, customer information, etc.) or by any other arrangement. Each arrangement can also be displayed in the GUI 107 as a graphical surface or object.

The GUI 107 is navigable by a user operating the user input device 110. In accordance with a process for accessing data objects stored in the storage medium 102, the processor 104, under instruction of the instruction memory 106, generates a graphical representation of the stored data objects on the display 108 so that a user can access one or more of the stored data objects. The processor 104 is configured to represent a processed combined representation of two or more arrangements of data objects as a graphical structure that, when rendered in the GUI 107 in the display 108 define a number of user-selectable graphical objects 109. Each graphical object provides a link to one or more data objects stored in the storage medium 102 and that correspond to a portion of the combined arrangements.

Figure 2:
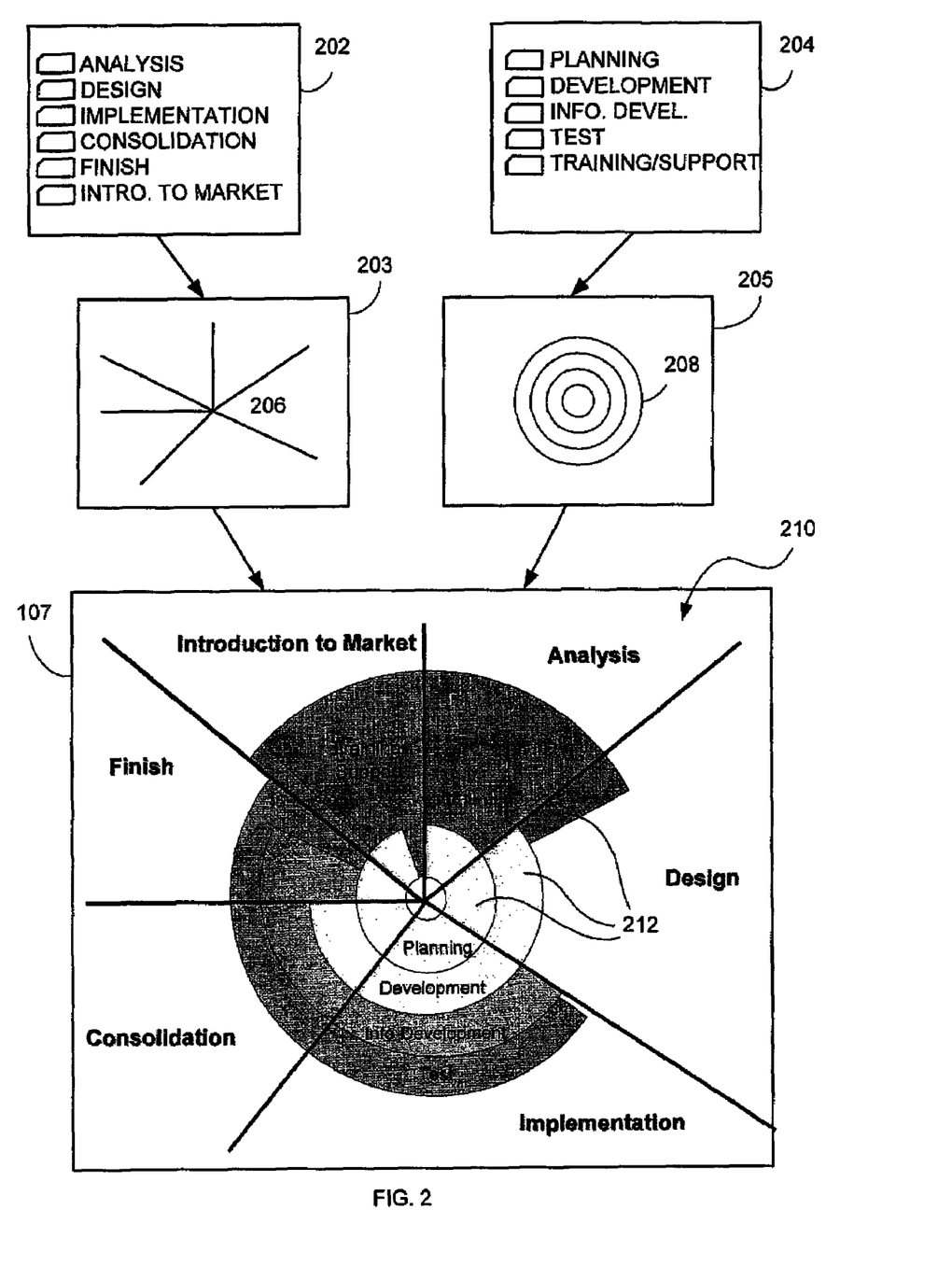
FIG. 2 is an interaction diagram showing steps that may be performed to combine two or more data object storage arrangements in a GUI.

FIG. 2 is an interaction diagram showing an example of steps that may be performed to generate a GUI 107 for providing access to data objects. A first data object arrangement 202 represents a first class of data objects and may be depicted as a list of named folders, each of which may "contain" one or more data objects such as documents, files, etc., that may in turn be represented by text, an icon or other type of graphic. According to the example, the first arrangement 202 is a list of project phases. A second data object arrangement 204 represents a second class of data objects and may also be depicted as a list of folders, as shown in the example for simplicity, and may also contain one or more data objects. In accordance with the example, the second arrangement 204 is a list of document types or subjects. Some or all of the data objects may be included in both arrangements 202 and 204, or neither. Those having skill in the art would recognize that each data object arrangement can take any form, such as a collection of icons, a tree diagram, or the like.

The first data object arrangement 202 can be represented as a first graphical structure 203. According to the example, the first graphical structure is a number of arc-sections 206 of a display area. The second data object arrangement 204 can be represented as a second graphical structure 205. According to the example, the second graphical structure is a number of concentric circles 208. Other graphical structures may be used to represent the first or second data object arrangements 202 and 204.

The first graphical structure 203 and the second graphical structure 205 are combined into a graphical representation 210 and displayed in at least a portion of the GUI 107 to define, by the intersection of graphical structures 203 and 205, a number of graphical objects 212. The resultant sectors that define the graphical objects 212 results from a process of determining and removing "empty" objects and resizing adjacent objects, as will be described in more detail below.

Each graphical object 212 defines a user-selectable link area that when selected, accesses data objects from the first and/or second arrangement of data objects 202, 204. The link area can be defined by a coordinate system within the GUI 107, by software code, or by any other mechanism. Based on how the graphical structures 203 and 205 are presented in the graphical representation 210, a user can immediately associate one or more data objects with a particular portion from the arrangement(s) according to which they are organized. For instance, according to the example, a user can immediately access all data objects that relate to "PLANNING" within a "DESIGN" phase. The access can be expanded to include two or more components of the first graphical structure 203 (i.e. two or more arc-sections 206) and/or two more components of the second graphical structure 205 (i.e. two or more concentric sectors 208). For example, a user can highlight two or more of the graphical objects 212 for simultaneous selection.

Before the GUI 107 is rendered, the graphical representation may be generated according to a process that analyzes whether any intersection of the graphical structures 203 and 205 are empty or not. If an intersection is empty of data objects, the graphical object representing the intersection is removed from or not rendered in the resultant GUI 107. If a graphical object is removed or not rendered, the resultant "gap" in the GUI may be filled-in by resizing of the remaining graphical objects. For example, neighboring graphical objects 212 of an empty space may be enlarged. Accordingly, only graphical objects 212 that are associated with at least one data object, i.e. are non-empty, are eventually rendered in the GUI 107.

Figure 3:
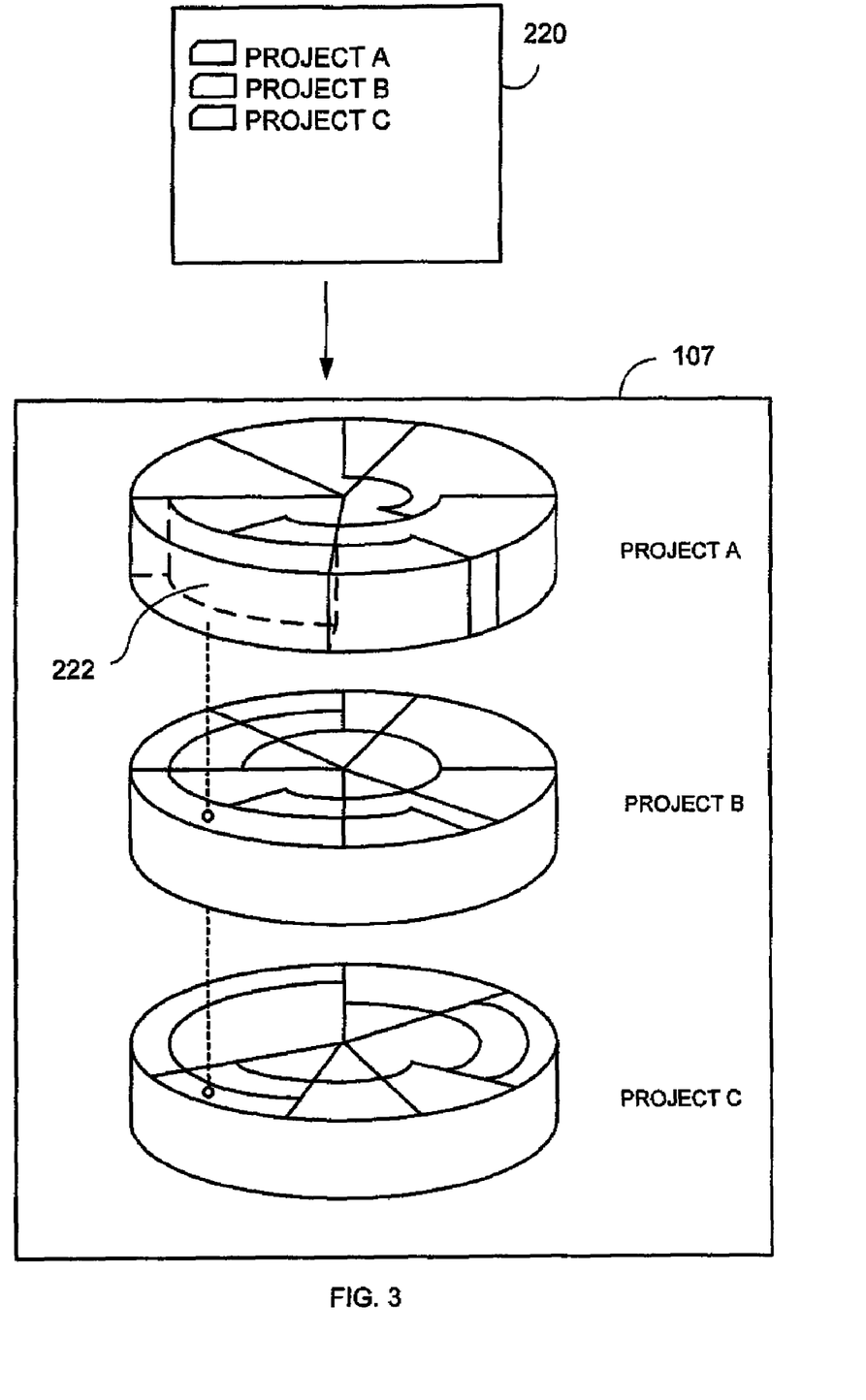
FIG. 3 is a diagram illustrating a three-dimensional version of a graphical access system.

FIG. 3 shows another example of a graphical user interface 107 for accessing data objects. In this example, and with reference to FIG. 2, a third data object arrangement 220 is depicted as another list of folders. Each folder in the example is related to a project. The third data object arrangement 220 is represented as a third graphical structure, i.e. a third dimension such as height, or as a number of separate cylinders. Other modifications are possible, such as additional graphical structures representing additional arrangements of data objects. As with other arrangements discussed above, the third data object arrangement 220 in FIG. 3 can be represented as any type of graphical structure. The combination of first, second and third graphical structures defines a number of graphical objects 222, depicted in the example as a three-dimensional polygon.

Each graphical object 222 provides a user-selectable link to data objects associated with the intersection of the arrangements represented by their respective graphical structures. In one embodiment, graphical objects 222 from one graphic can be related to another graphical object from a separate graphic. For example, if all three project cylinders include arc-sections to indicate project phase, then the phases of each project can be linked by a current date.

Many different logical arrangements can be displayed as a graphical structure in the GUI 107. Generally only one attribute structure is needed to render a GUI 107 as shown in FIG. 2. However, in a case having three logical arrangements, every category of a first attribute is combined with every category of a second attribute, and each of these combinations is again combined with every category of a third attribute. Each combination represents an intersection of three categories, each intersection originating from one of the three attributes. Every intersection is represented by a graphical object or segment in the graphical surface, preferably according to a coordinate system. In order to simplify the graphical representation, every segment that refers to an empty intersection, i.e. no data object in a corresponding section of the combined first, second, and third attributes, may removed so that only those segments are displayed that actually contain documents are displayed. The resulting gaps in the GUI 107 may be filled by resizing neighboring segments according to various algorithms.

Additional graphical representations are possible if one of the dimensions (arrangements) is temporal. For instance, the size or proportions of the segments in the graphical structure 203 or 205 from FIG. 2 can be weighted according to a weight scheme. In a simplified example, each of the sectional phases of graphical structure 203 can be weighted according to an actual time length of the corresponding phase. Further, a graphical structure may represent additional attributes. For example, individual sections of the graphical structure 203 can contain additional milestones that are not necessarily identical to the borderlines of the sections. Nevertheless these additional milestones may be included in the graphical representation 210 in the GUI 107, indicating that certain categories of data objects do not start with a new phase, i.e. at the borderline between two sections, but after a certain milestone, e.g. in the middle of a graphical object or segment 212. The relation between attributes, such as milestones, and segments, such as a graphical object 212, may be stored in the storage medium 102 or extracted from a project management system.

Figure 4:
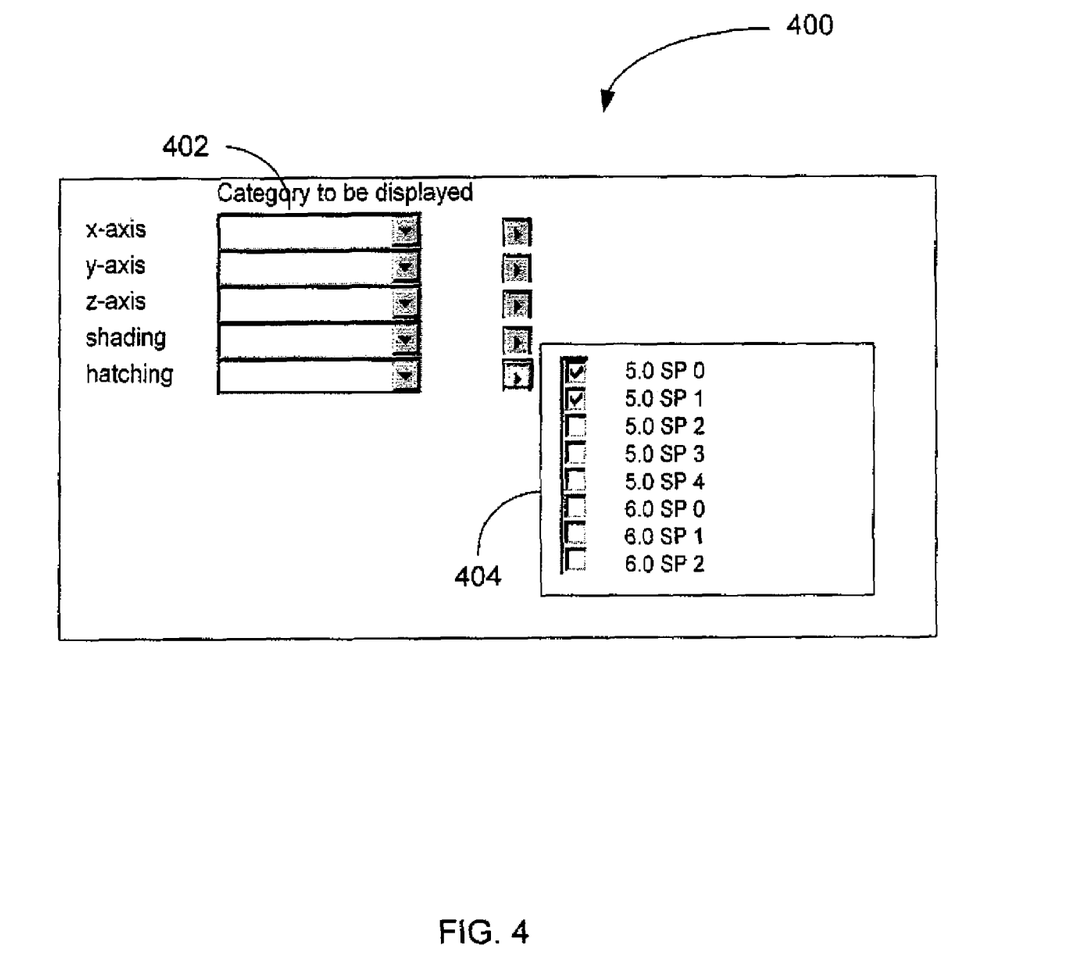
FIG. 4 depicts a menu for generating further attributes of a graphical representation.

Other dimensions (e.g. attributes) can be rendered in the graphical representation 210. To this end, FIG. 4 shows a menu 400 that may be added in the GUI 107 to allows further filtering of the graphical representation 210. A user may select one or more various attributes 402 from the menu 400 and specify values 404 for the selected attributes 402. After this selection, those graphical objects 212 that contain data objects that have these attribute values 404 can be graphically marked with a predefined pattern, i.e. hatching. The user can customize which pattern is to be used for which attribute by default, but can also change the pattern from the menu 400.

Figure 5:
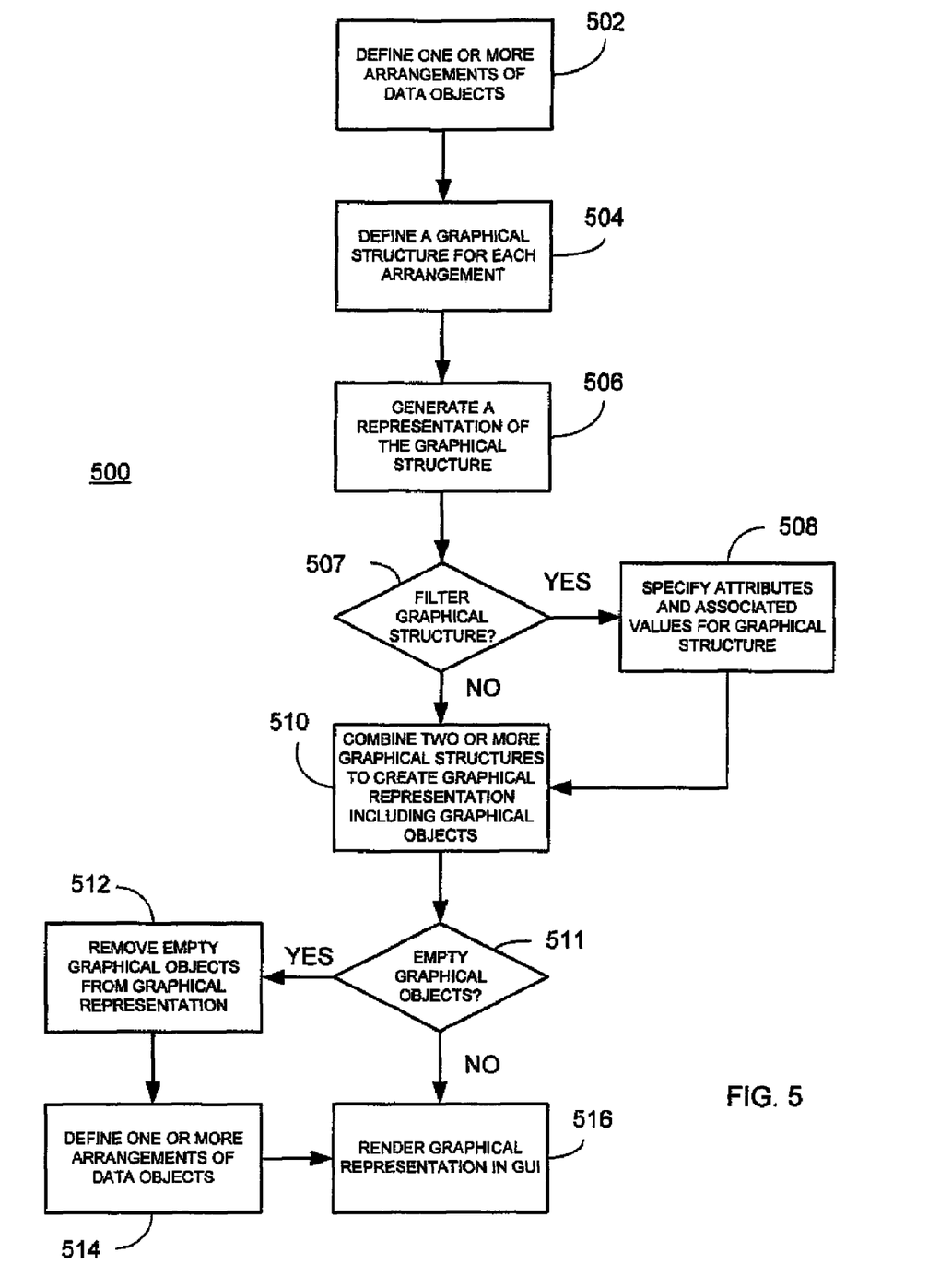
FIG. 5 is a flowchart of a process for providing access to data objects stored according to one or more storage arrangements.

FIG. 5 is a flowchart of a process 500 for providing access to data objects stored according to one or more storage arrangements. At block 502 one or more arrangements of data objects are defined. The arrangements may defined according to any logical or hierarchical structure in which one or more data objects are associated with one or more other data objects. The data objects may be documents, files, data, etc. At block 504 a graphical structure is defined for each arrangement of data objects. Each graphical structure can be defined by shape, by coordinate axes (e.g. x, y, z), or any other graphical structure that can be associated to an arrangement of data objects.

At block 506 a representation of the graphical structure may be generated and may include a number of individual segments defined by boundaries. Each segment represents a group of data objects that are associated according to some scheme. Thus, each segment of the graphical structure may reference or otherwise be linked to one or more data objects. Alternatively, depending on how the graphical structure is defined, a segment may be "empty" and not contain or otherwise be associated with a data object. For example, if no data object exists for a given real phase of a project, then a segment representing that phase will be empty.

At block 507, a user may filter the graphical structure or representation of a combination of structures. If so, at block 508 any number of attributes and associated values for the attributes may be specified for individual graphical objects. The attributes may further define or filter a graphical object in a case where boundaries of a generated graphical object do not fully account for representations of data objects therein. For instance, a graphical object may be subdivided according to certain attributes. Each of the attributes may be represented by a graphical attribute such as color, shading, or sub-dividing boundaries, etc. The attributes and values may be specified from external user input, which is processed and rendered as a user-selectable menu of rendering options.

At block 510 two or more graphical structures are combined to generate a graphical representation of the combination. The combination of the segments of the structures yields a graphical representation that includes one or more graphical objects. Each graphical object represents an intersection of the combined graphical structures, such as the overlap of two or more segments from the combined graphical structures. The graphical representation may include the attributes specified and defined at block 508.

At block 511, a determination is made whether any graphical objects are "empty," i.e. do not reference or are not otherwise associated with any data objects. At block 512, empty graphical objects may be processed out of the graphical representation, to enhance the eventual rendered graphical user interface. Remaining graphical objects, i.e. those that represent or otherwise are linked to at least one data object, may be resized at block 514. According to one algorithm, neighboring graphical object to a removed graphical object may be expanded or enlarged to fill in a gap created by the removal step of block 512. Other resizing or rearranging algorithms are possible.

At block 516, the graphical representation is rendered in a GUI. The graphical representation may be rendered according to any known graphics processing algorithm, including mapping the graphical representation to a predefined coordinate structure in the GUI. Each graphical object in the graphical representation represents a link to one or more data objects. The link may be defined according to the coordinate structure as well. A user may access the data objects by activating the link, i.e. such as by moving a mouse pointer over a graphical object and clicking on it. The GUI will then render a representation of the data objects accessed via the link. A pop-up description may also be processed with the rendered graphical representation. For instance, when a user passes an icon over a graphical object, the "contents" of that object can be displayed in pop-up window or other information interface.

Although a few embodiments have been described in detail above, other modifications are possible. Portions of this disclosure discuss operation through a portal, but any number of graphical user interface and access systems and methods may be used to provide access to stored data objects. The logic flow depicted in FIG. 5 does not require the particular order shown, or sequential order, to achieve desirable results. For instance, the step of specifying attributes and associated values at block 508 may be performed after combination of graphical structures and/or rendering of the graphical representation of the combination. Other embodiments may be within the scope of the following claims.

The invention claimed is:

1. A method comprising:
representing a first arrangement of data objects as a first graphical structure in a graphical user interface (GUI), wherein the first arrangement is based on at least one of a date or a time, and the first graphical structure includes an area divided into a number of arc-sections, wherein each arc-section represents a duration of at least one of the date or the time;
concurrently representing a second arrangement of data objects as a second graphical structure in the GUI, wherein the second arrangement is based on at least one of a name, a type, or a size and is related to at least one of the date or the time of the first arrangement, and the second graphical structure includes a plurality of sectors coaxially arranged in the area, wherein each sector represents at least one of the name, the type, or the size;
wherein a combination of the first and second graphical structures in the GUI defining a plurality of user-selectable graphical objects each providing access to one or more data objects associated with a corresponding portion of the combination of the first and second arrangements, and wherein at least one of the representing and the concurrently representing are implemented on at least one processor.

2. The method in accordance with claim 1, wherein the first graphical structure comprises a number of arc-sections of an area, and wherein the second graphical structure comprises a plurality of sectors coaxially arranged in the area.

3. The method in accordance with claim 2, wherein the area is circular.

4. The method in accordance with claim 2, wherein at least one of the plurality of sectors is intersected by one of the arc-sections.

5. The method in accordance with claim 1, wherein the first graphical structure comprises a number of columns in a squared area, and wherein the second graphical structure comprises a number of rows in the squared area intersected by the columns.

6. The method in accordance with claim 1, further comprising:
concurrently representing a third arrangement of data objects as a third graphical structure in the GUI;
a combination of the first, second and third graphical structures in the GUI defining the plurality of user-selectable graphical objects, each graphical object providing a link to a portion of storage associated with a corresponding portion of a combination of the first, second and third arrangements.

7. The method in accordance with claim 1, wherein the plurality of graphical objects forms a three-dimensional cylinder in the GUI, wherein the first graphical structure corresponds to arc-segments of the cylinder, wherein the second graphical structure corresponds to coaxial sectors of the cylinder, and wherein the third graphical structure corresponds to a height of the cylinder.

8. The method in accordance with claim 7, wherein the cylinder includes a plurality of sub-sections.

9. An apparatus comprising:
at least one processor; and
at least one memory, wherein the at least one processor and the at least one of memory are configured to provide
a graphical user interface (GUI) comprising a plurality of user-selectable graphical objects defined by a combination of a first graphical structure representing a first arrangement of data objects and a second graphical structure representing a second arrangement of data objects, wherein each graphical object provides access to one or more data objects associated with a corresponding portion of the combination of the first and second arrangements, wherein the first arrangement is based on at least one of a date or a time, and the first graphical structure includes an area divided into a number of arc-sections, wherein each arc-section represents a duration of at least one of the date or the time, and wherein the second arrangement is based on a name, a type, or a size and is related to the date or time of the first arrangement, and the second graphical structure includes a plurality of sectors coaxially arranged in the area, wherein each sector represents at least one of the name, the type, or the size.

10. The apparatus in accordance with claim 9, wherein each graphical object comprises a two-dimensional polygon.

11. The apparatus in accordance with claim 9, wherein the GUI includes a circular area, and wherein the first graphical structure comprises a number of arc-sections of the circular area.

12. The apparatus in accordance with claim 11, wherein the second graphical structure comprises a plurality of sectors of the circular area.

13. The apparatus in accordance with claim 9, wherein each graphical object is defined by a combination of the first and second graphical structures, and by a third graphical structure representing a third data object storage arrangement.

14. The apparatus in accordance with claim 13, wherein each graphical object comprises a three-dimensional polygon.

15. A system comprising
a display providing a graphical user interface (GUI);
a storage medium for storing one or more data objects;
a processor responsive to instructions stored in an instruction memory, and configured to represent a first arrangement of data objects as a first graphical structure in the GUI, and to represent a second arrangement of data objects as a second graphical structure in the GUI;
wherein a combination of the first and second graphical structures in the GUI defines a plurality of user-selectable graphical objects, each graphical object providing access to one or more data objects in the storage medium associated with a corresponding portion of the combination of the first and second arrangements, wherein the first arrangement is based on at least one of a date or a time, and the first graphical structure includes an area divided into a number of arc-sections, wherein each arc-section represents a duration of at least one of the date or the time, and wherein the second arrangement is based on at least one of a name, a type, or a size and is related to the date or time of the first arrangement, and the second graphical structure includes a plurality of sectors coaxially arranged in the area, wherein each sector represents at least one of the name, the type, or the size.

16. The system in accordance with claim 15, further comprising a user input device for receiving input signals to navigate the GUI for accessing the plurality of user-selectable graphical objects.

17. The system in accordance with claim 15, wherein the GUI defines a two-dimensional graphic formed of the plurality of user-selectable graphical objects.

18. The system in accordance with claim 15, wherein the processor is further configured to represent a third arrangement of data objects as a third graphical structure in the GUI, and wherein a combination of the first, second and third graphical structures in the GUI defines the plurality of user-selectable graphical objects.

19. The system in accordance with claim 18, wherein the GUI defines a three dimensional graphic formed of the plurality of user-selectable graphical objects.

* * * * *